United States Patent
Ribarov et al.

(10) Patent No.: US 10,400,676 B2
(45) Date of Patent: Sep. 3, 2019

(54) ENHANCED APU OPERABILITY

(71) Applicant: United Technologies Corporation, Hartford, CT (US)

(72) Inventors: Lubomir A. Ribarov, West Hartford, CT (US); David S. Liscinsky, Glastonbury, CT (US); Meredith B. Colket, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 715 days.

(21) Appl. No.: 14/902,148

(22) PCT Filed: Jun. 24, 2014

(86) PCT No.: PCT/US2014/043868
§ 371 (c)(1),
(2) Date: Dec. 30, 2015

(87) PCT Pub. No.: WO2015/050601
PCT Pub. Date: Apr. 9, 2015

(65) Prior Publication Data
US 2016/0369700 A1 Dec. 22, 2016

Related U.S. Application Data

(60) Provisional application No. 61/841,656, filed on Jul. 1, 2013.

(51) Int. Cl.
*F02C 7/224* (2006.01)
*B64D 41/00* (2006.01)
(Continued)

(52) U.S. Cl.
CPC .............. *F02C 7/224* (2013.01); *B64D 37/34* (2013.01); *B64D 41/00* (2013.01); *F02C 3/22* (2013.01);
(Continued)

(58) Field of Classification Search
CPC ........ B64D 37/32; B64D 37/30; B64D 37/34; A62C 3/08; B01D 2259/4575; F02C 7/224
See application file for complete search history.

(56) References Cited

U.S. PATENT DOCUMENTS

| 4,827,716 A | 5/1989 | Vershure, Jr. |
| 5,069,692 A | 12/1991 | Grennan et al. |

(Continued)

FOREIGN PATENT DOCUMENTS

| EP | 1923637 A2 | 5/2008 | |
| GB | 924330 A | * 3/1955 | ................ F02C 3/30 |

(Continued)

OTHER PUBLICATIONS

Extended European Search Report for EP Application No. 14851306.2, dated Feb. 16, 2017, 8 Pages.

(Continued)

*Primary Examiner* — Gerald L Sung
*Assistant Examiner* — William L Breazeal
(74) *Attorney, Agent, or Firm* — Kinney & Lange, P.A.

(57) ABSTRACT

A fuel system for a gas turbine engine comprises an injector disposed to inject fuel and air into a combustor of the gas turbine engine. In a first embodiment, the fuel system further comprises an air separation module configured to supply oxygen-enriched air into the combustor via the injector for combustion. In a second embodiment, the fuel system further comprises a barbotage system and a heating element. The barbotage system is configured to feed hydrogen to the injector, and the heating element is configured to pre-heat the fuel.

5 Claims, 5 Drawing Sheets

(51) Int. Cl.
*F02C 3/22* (2006.01)
*F02C 7/26* (2006.01)
*B64D 37/34* (2006.01)
*F02C 9/40* (2006.01)

(52) U.S. Cl.
CPC .................. *F02C 7/26* (2013.01); *F02C 9/40* (2013.01); *F05D 2220/50* (2013.01)

(56) References Cited

U.S. PATENT DOCUMENTS

| | | | |
|---|---|---|---|
| 5,131,225 A * | 7/1992 | Roettger | B64D 41/00 60/727 |
| 6,491,759 B1 | 12/2002 | Christen et al. | |
| 7,451,753 B2 | 11/2008 | Bell et al. | |
| 7,828,874 B2 | 11/2010 | Surawski et al. | |
| 7,954,753 B2 | 6/2011 | Hoffjann et al. | |
| 8,245,978 B1 | 8/2012 | Beers et al. | |
| 8,398,755 B2 | 3/2013 | Coan et al. | |
| 2002/0083714 A1 * | 7/2002 | Bakholdin | F01D 15/10 60/776 |
| 2006/0151669 A1 | 7/2006 | Jones | |
| 2006/0254643 A1 | 11/2006 | Jones et al. | |
| 2007/0033949 A1 * | 2/2007 | Raybold | C01B 3/386 60/780 |
| 2007/0220896 A1 * | 9/2007 | Varatharajan | F02C 1/002 60/772 |
| 2008/0060523 A1 | 3/2008 | Tom et al. | |
| 2011/0108080 A1 * | 5/2011 | Kwok | H01L 35/10 136/205 |
| 2011/0212374 A1 * | 9/2011 | Rosenzweig | C01B 3/065 429/421 |
| 2011/0243836 A1 * | 10/2011 | Curello | H01M 8/065 423/657 |
| 2012/0198850 A1 | 8/2012 | Chin et al. | |
| 2012/0242437 A1 | 9/2012 | Buse et al. | |
| 2013/0160460 A1 * | 6/2013 | Dalton | F02C 7/12 60/796 |

FOREIGN PATENT DOCUMENTS

| | | |
|---|---|---|
| WO | WO 02/45031 A1 | 6/2002 |
| WO | WO03049122 A2 | 6/2003 |
| WO | WO 2005/075891 A1 | 8/2005 |
| WO | WO 2005/107002 A1 | 11/2005 |
| WO | WO 2011/005946 A1 | 1/2011 |

OTHER PUBLICATIONS

International Search Report and Written Opinion from PCT Application Serial No. PCT/US2014/043868, dated Apr. 17, 2015, 13 pages.

* cited by examiner

ENHANCED APU OPERABILITY

BACKGROUND

The present invention relates generally to gas turbine engines, and more particularly to fuel systems for auxiliary power units.

Large commercial aircraft typically include on-board auxiliary power units (APUs), located in the tail sections of the aircraft, to provide electrical power and compressed air for systems throughout the aircraft. When an aircraft is on the ground, the primary propulsion engines of the aircraft are shut down, and the auxiliary power unit provides the main source of power for a variety of systems, such as the environmental control systems, hydraulic pumps, electrical systems, and main engine starters. The auxiliary power unit may also provide power during in-flight operations, such as for electrical and pneumatic systems.

Low temperatures associated with high altitudes can pose difficulties to in-flight startup and operation of traditional APUs. Low fuel temperatures can result in increased fuel viscosity, causing fuel injected into an APU combustor to form larger-than-usual droplets. The reduced area/volume ratio of such droplets reduces fuel vaporization required for combustion ignition, thereby impeding APU operability. Simultaneously, low air temperatures present a larger-than-usual temperature gap that must be bridged to reach fuel ignition temperatures. In combination, low fuel and air temperatures can prevent or delay APU starting, impair sustained APU operability, and reduce the fuel efficiency of APU operation.

SUMMARY

The present invention is directed toward a fuel system for a gas turbine engine, comprising an injector disposed to inject fuel and air into a combustor of the gas turbine engine. In a first embodiment, the fuel system further comprises an air separation module configured to supply oxygen-enriched air into the combustor via the injector for combustion. In a second embodiment, the fuel system further comprises a barbotage system and a heating element. The barbotage system is configured to feed hydrogen to the injector, and the heating element is configured to pre-heat the fuel.

DETAILED DESCRIPTION

Figure 1:
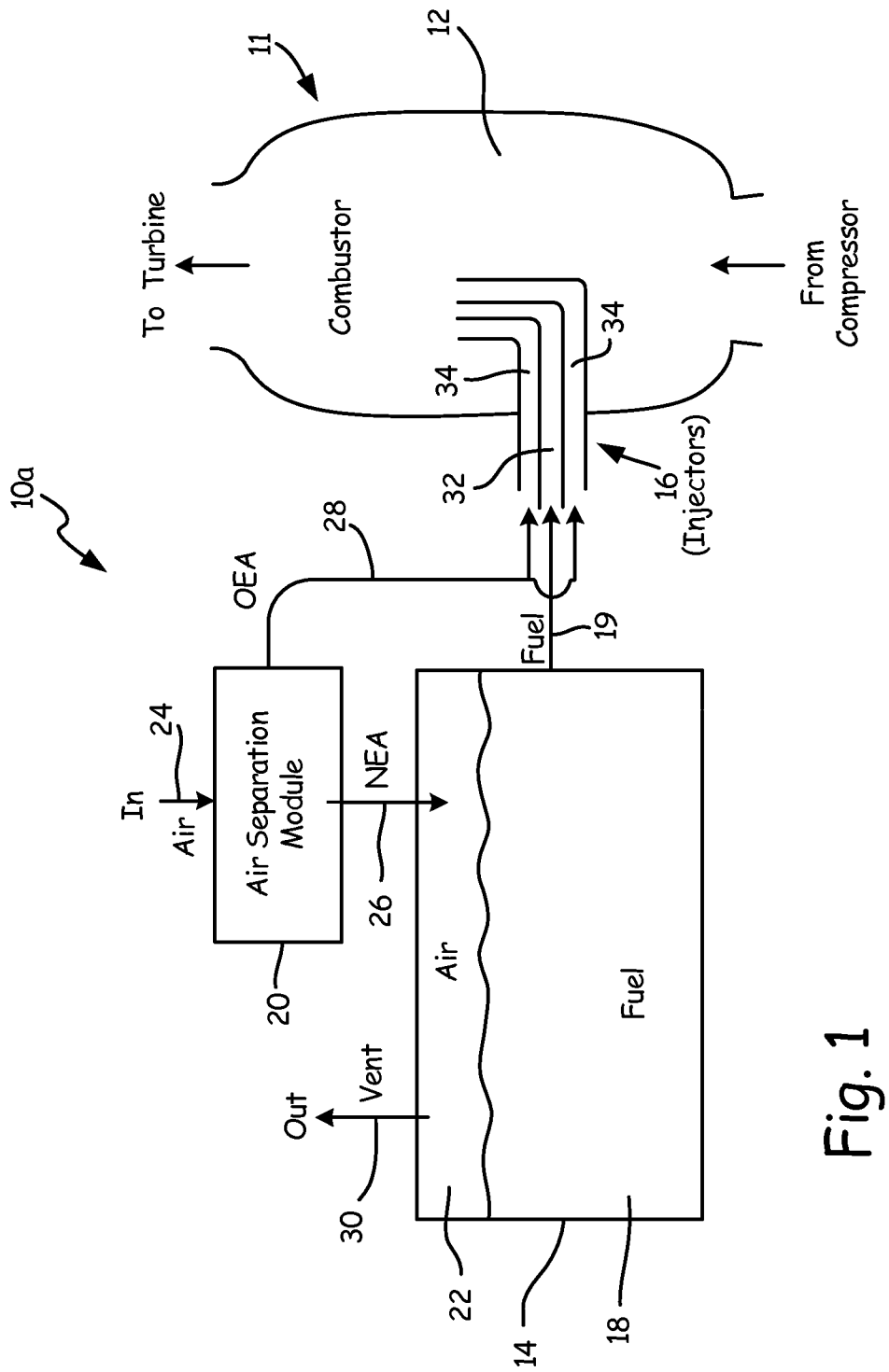
FIG. 1 is schematic view of a first embodiment of an enhanced operability system for a gas turbine engine.

FIG. 1 is a schematic view of enhanced operability system 10a, for engine 11, which may, for instance, be an aircraft auxiliary power unit (APU) gas turbine engine. Enhanced operability system 10a comprises combustor 12 of engine 11, fuel tank 14, injectors 16, fuel 18, air separation module (ASM) 20, fuel tank air/vapors 22, ASM inlet 24, nitrogen-enriched air (NEA) line 26, oxygen enhanced air (OEA) line 28, fuel tank vent 30, fuel channel 32, and air channel 34.

Enhanced operability system 10a is a fuel system configured to supply fuel 18 to combustor 12 of engine 11. Fuel 18 may, for instance, be a conventional aircraft fuel such as Jet A, JP-8, or any other appropriate petroleum-derived or other approved fuel. Fuel 18 is stored in fuel tank 14, and supplied to injectors 16 via fuel line 19 to be injected into combustor 12 in aerosolized form via injectors 16. Fuel tank 14 is a fuel reservoir configured to contain fuel 18, and connected to ASM 20. Fuel tank air/vapors 22 fills up the remainder of fuel tank 14 not occupied by fuel 18. ASM 20 is an air separation device configured to inert fuel tank air/vapors 22 by injecting nitrogen-enriched air to reduce the flammability of fuel vapors within fuel tank 14. ASM 20 receives atmospheric air via ASM inlet 24, which may for instance draw in air from outside the aircraft. ASM 20 separates air received via ASM inlet 24 into nitrogen-enriched air (NEA) with increased nitrogen content and reduced oxygen content, and oxygen-enriched air (OEA) with increased oxygen content and reduced nitrogen content. NEA is fed into fuel tank 14 via NEA line 26 to inert fuel tank air/vapors 22, while OEA is fed into injectors 16 via OEA line 28 for combustion in combustor 12. Fuel tank 14 is further outfitted with fuel tank vent 30, a gas vent disposed to vent any excess of fuel tank air/vapors 22 to avoid pressure buildup within fuel tank 14. Vent 30 may, for instance, be a passive vent that bleeds excess fuel tank air/vapors 22 (e.g. into an external environment). Some embodiments of enhanced operability system 10a may include filters disposed to prevent fuel vapors from escaping via fuel tank vent 30. A simple on-way check valve (not shown) may be added to prevent any unwanted backflow back into the fuel tank.

Fuel 18 from fuel tank 14 is received by fuel channel 32 of injectors 16, which aerosolize and inject fuel 18 into combustor 12 to power engine 11. Simultaneously, atmospheric air and OEA from OEA line 28 are fed into combustor 12 through air channel 32 of injectors 16. Fuel channel 32 and air channel(s) 34 are fuel and gas lines, respectively, running through injectors 16 into combustor 12. Fuel 18 mixes with air supplied by air channel 34 within combustor 12. Injectors 16 may, for example, comprise a nozzle (not shown) that aerosolizes fuel 18 as it is injected into combustor 12. Combustor 12 may include swirlers (not shown) and other features configured to promote mixing of fuel 18 and air for more efficient combustion.

Where conventional systems dump OEA from ASM 20 overboard, enhanced operability system 10a facilitates ignition and enhances combustion within combustor 12 by injecting this oxygen-rich gas into combustor 12. The increased oxygen content of the resulting fuel-air mixture within combustor 12 reduces the energy required to start and sustain engine burn, mitigating the effects of low temperature air commonly experienced at high altitudes.

Figure 2:
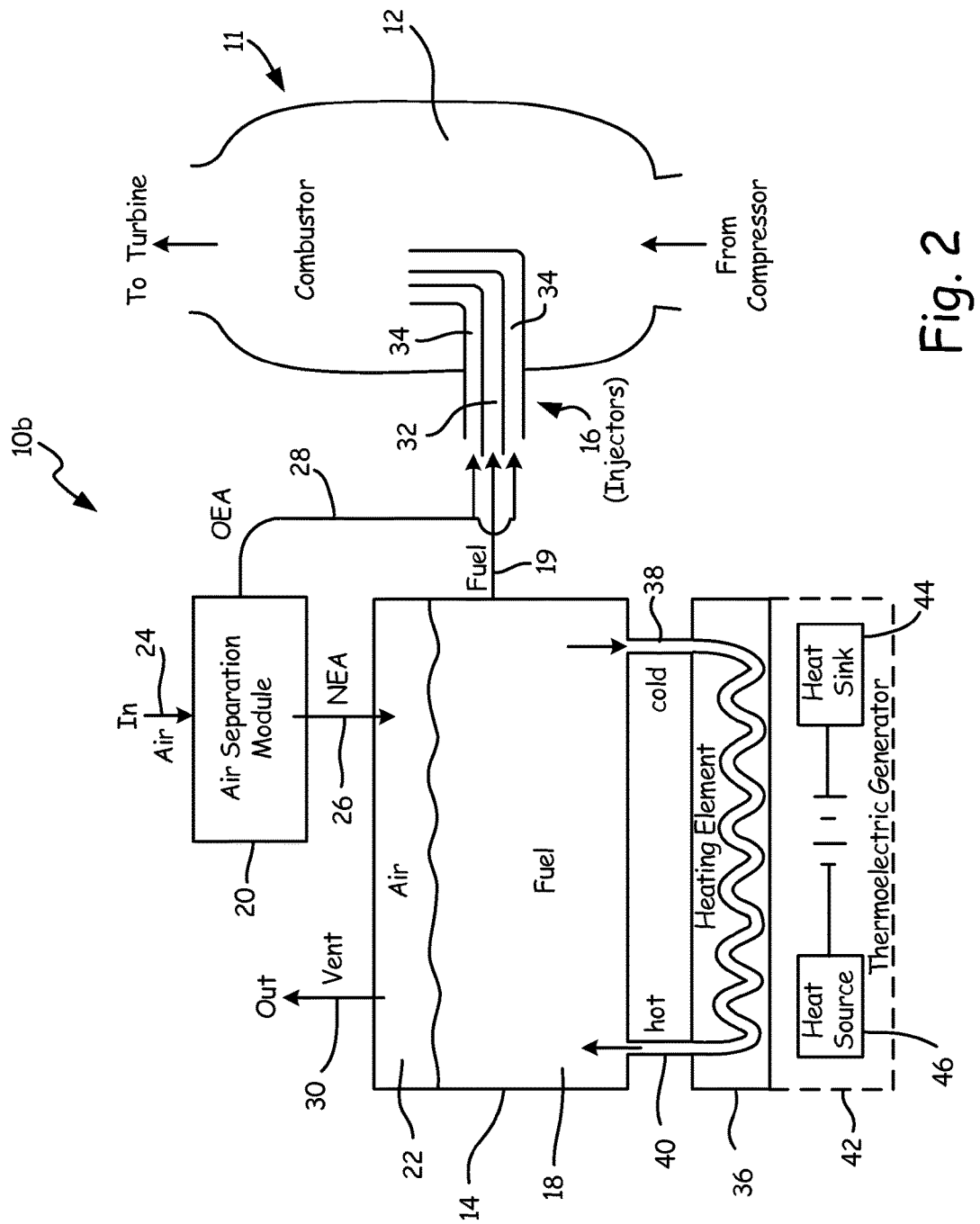
FIG. 2 is a schematic view of a second embodiment of an enhanced operability system for a gas turbine engine

FIG. 2 is a schematic view of enhanced operability system 10b, an alternative embodiment of enhanced operability system 10a (see FIG. 1). Enhanced operability system 10b is generally similar to enhanced operability system 10a, but further comprises heating element 36, heating element (HE) inlet 38, HE outlet 40, thermoelectric generator 42, heat sink 44, and heat source 46. In all other aspects, enhanced operability system 10b operates substantially as described above with respect to enhanced operability system 10a.

Heating element 36 is a circulative heater disposed to receive relatively cold fuel 18 from fuel tank 14 via HE inlet 38, heat this fuel, and return the heated fuel to fuel tank 14 via HE outlet 40. Heating element 36 may, for instance, be an electrical heater such as a resistive heater that circulates fuel 18 through a circuitous path lined with resistive elements. Heating element 36 may be segregated from fuel tank 14 to avoid explosive hazards, e.g. by insulating heating element 36 from fuel tank 14 or by situating heating element 36 in a nonadjacent location to fuel tank 14. In the depicted embodiment, heating element 36 is an electrical heater powered by thermoelectric generator 42. Thermoelectric generator 42 is a thermoelectric ("Seebeck") device that converts heat into electricity based on a temperature differential between heat sink 44 and heat source 46 in one embodiment. Thermoelectric generator 42 may, for instance, be a bismuth telluride or lead telluride thermoelectric generator. Heat sink 44 may, for instance, be an aircraft tail cone environment or other cold aircraft location, while heat source 46 may, for instance, be an aircraft cabin, or any other high-temperature environment. Although heating element 36 is depicted as powered by thermoelectric generator 42, any appropriate electrical source could equivalently be used. In some embodiments, heating element 36 may be a non-electric heater such as a heat exchanger coupled to a local heat source (see FIG. 4, described below).

Heating element 36 operates to gradually and/or continuously elevate the temperature of fuel 18 in fuel tank 14, thereby counteracting heat loss to the cold environment at high altitudes. Heating element 36 can be combined with the system described above with respect to FIG. 1, wherein combustion is facilitated by injecting oxygen-rich air from OEA line 28 into air channel 32 of injectors 16.

Figure 3:
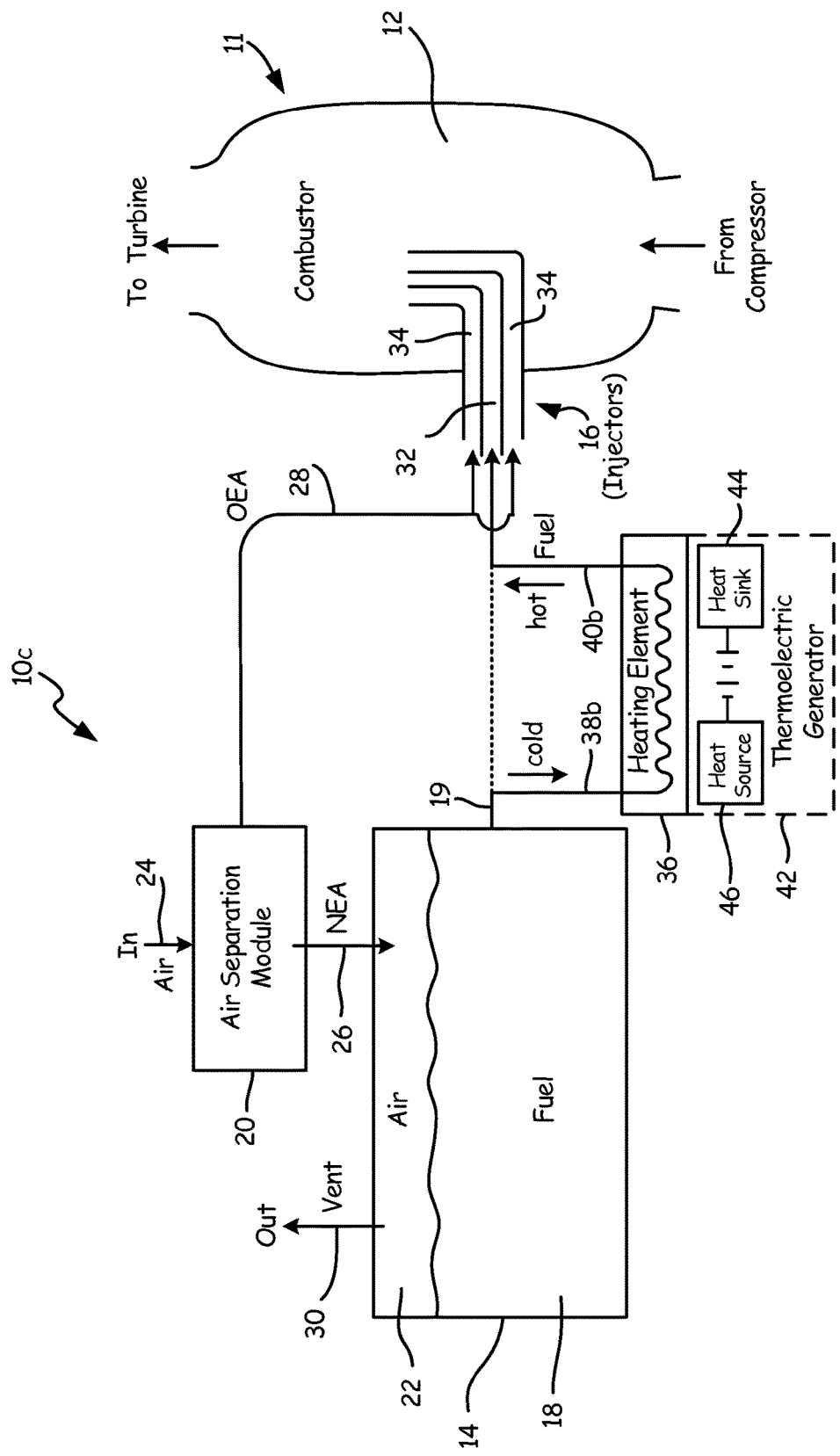
FIG. 3 is a schematic view of a third embodiment of an enhanced operability system for a gas turbine engine.

FIG. 3 is a schematic view of enhanced operability system 10c, an alternative embodiment of enhanced operability system 10b. Enhanced operability system 10c is generally similar to enhanced operability system 10b, with the enhanced operability system 10c heating element 36 connected to fuel line 19, rather than to fuel tank 14. In this embodiment, HE inlet 38b diverts some or all fuel passing through fuel line 19 into heating element 36. HE outlet 40b returns this fuel at a higher temperature to fuel line 19 upstream of injectors 16. This arrangement provides increased efficiency by only heating fuel en route to injectors 16 and combustor 12, rather than on the entirety of fuel 18 in fuel tank 14. This arrangement may be utilized as an alternative to the heating scheme of enhanced operability system 10b, or to supplement heating by the scheme of enhanced operability system 10b.

Figure 4:
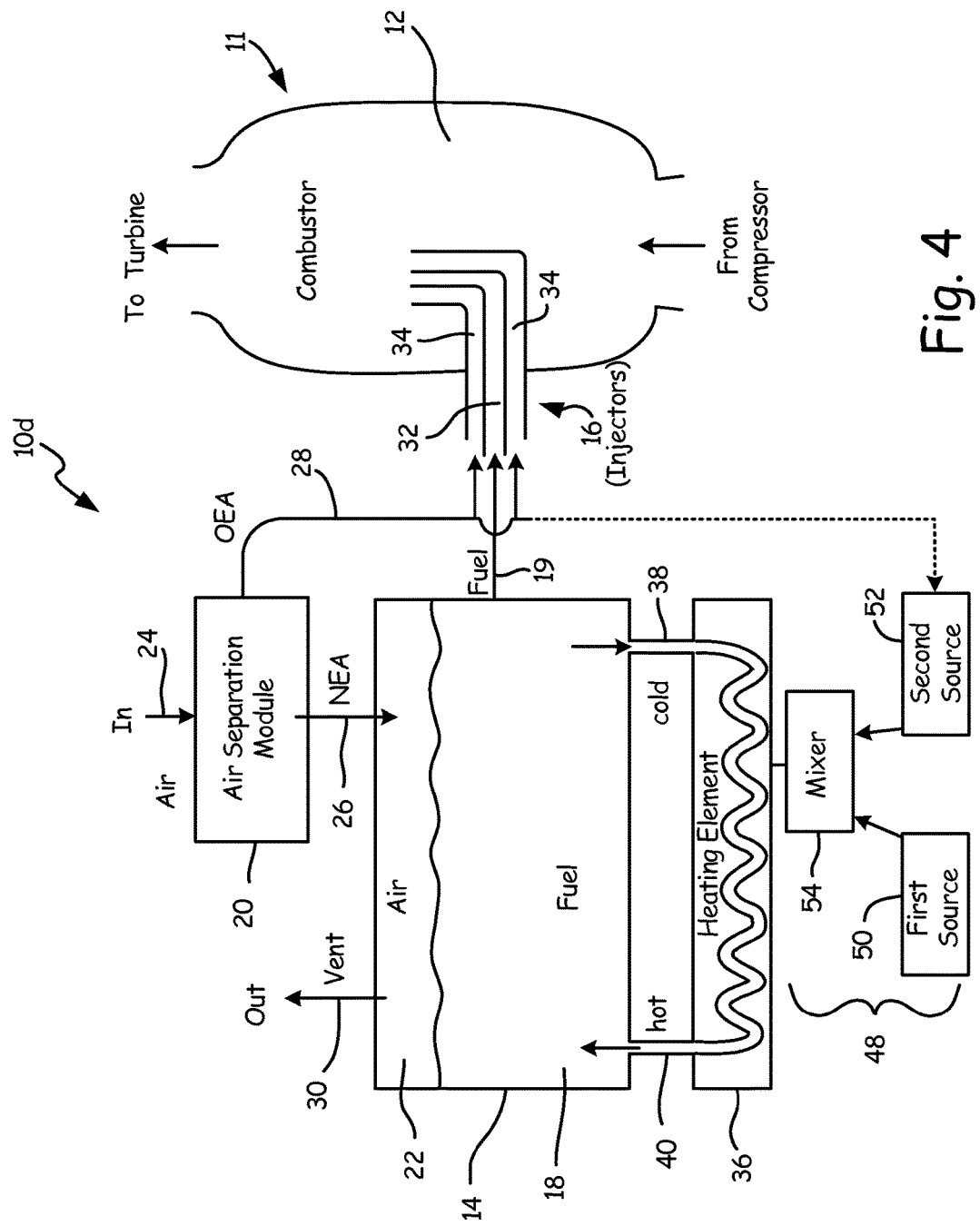
FIG. 4 is a schematic view of a fourth embodiment of an enhanced operability system for a gas turbine engine.

FIG. 4 is a schematic view of enhanced operability system 10d, an alternative embodiment of enhanced operability systems 10a-10c. Enhanced operability system 10d is generally similar to enhanced operability system 10b, but replaces thermoelectric generator 42 with chemical system 48 comprising first chemical source 50, second chemical source 52, and mixer 54.

As described previously with respect to FIG. 2, heating element 36 is a circulative heater disposed to receive cold fuel 18 from fuel tank 14 via HE inlet 38, heat that fuel, and recycle heated fuel into fuel tank 14 via HE outlet 40. Enhanced operability system 10d heats heating element 36 with chemical system 48. In one embodiment, heating element 36 may be an electrical heater as described above, and chemical system 48 may be a fuel cell that mixes a first chemical from first chemical source 50 with a second chemical from second chemical source 52 at mixer 54 to produce electricity to power heating element 36. In one possible embodiment, chemical system 48 may for instance be a direct borohydride fuel cell (DBFC) wherein first chemical source 50 is a reservoir containing lithium borohydride (LiBH$_4$), and second chemical source is an oxygen ($O_2$) source such as OEA line 28 (as shown) or an atmospheric air source (not shown). A simple one-way check valve (not shown) may be added to prevent any unwanted OEA backflow into ASM 20. The direct oxidization and decomposition of lithium borohydride produces water, lithium metaborate (LiBO$_2$) and electricity as follows:

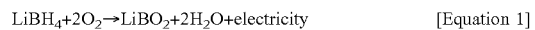

$$LiBH_4 + 2O_2 \rightarrow LiBO_2 + 2H_2O + \text{electricity} \quad \text{[Equation 1]}$$

Electricity produced in the reaction of Equation 1 powers heating element 36 substantially as described previously with respect to FIG. 2. Water and lithium borohydride produced as byproducts in this reaction are harmless, and may be dumped overboard. Alternatively, these byproducts may be stored for use in other reactions (see FIG. 5, below), or for later disposal.

Enhanced operability system 10d may inject oxygen-rich air from ASM 20 into combustor 12 as presented previously with respect to FIGS. 1 and 2. Embodiments of enhanced operability system 10d that use OEA line 28 to provide oxygen for second chemical source 52, OEA line 28 may either provide oxygen exclusively to chemical system 48, or may feature a split path (shown in dotted lines in FIG. 4) that provides some oxygen-rich air to chemical system 48, and some to combustor 12.

Figure 5:
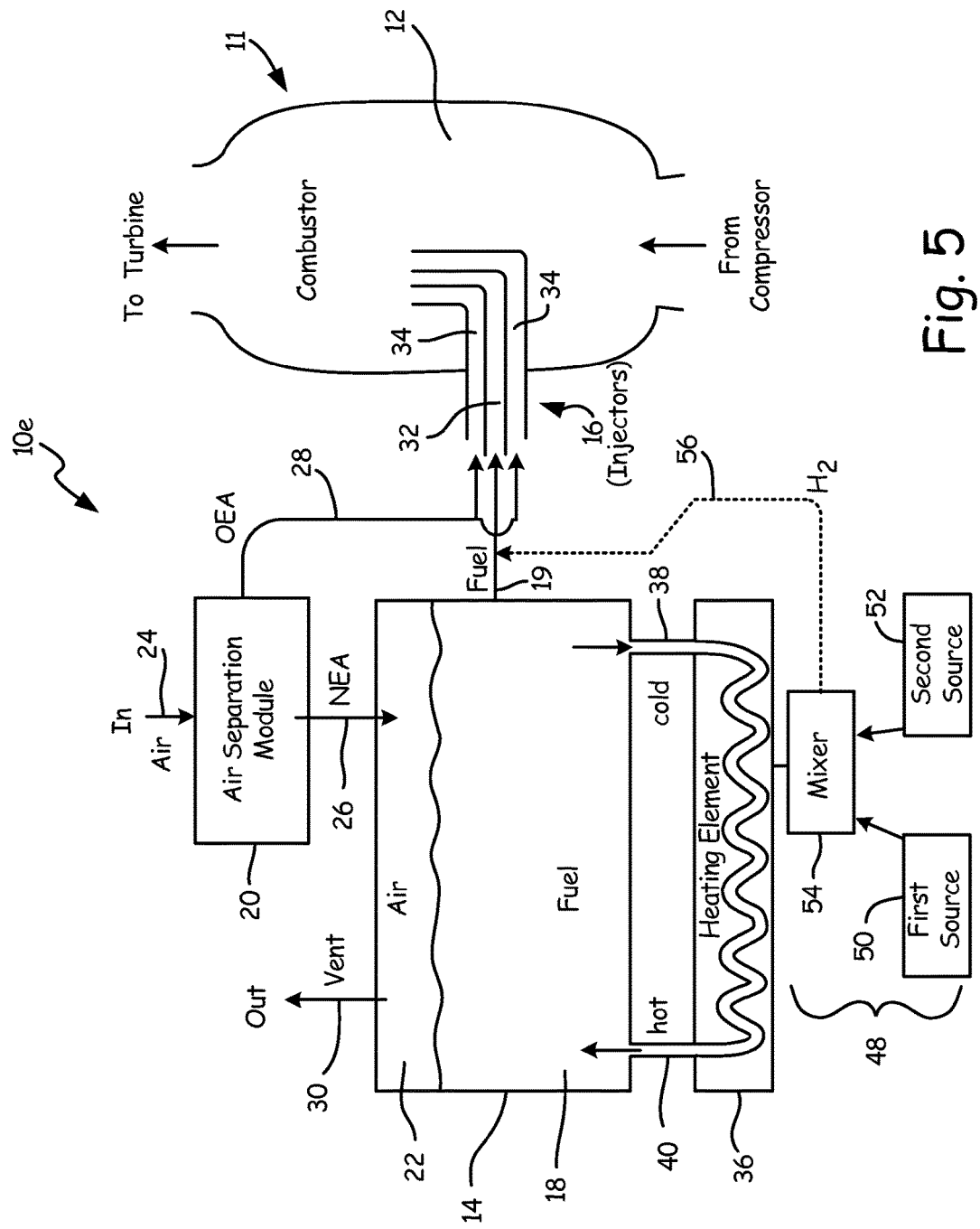
FIG. 5 is a schematic view of a fifth embodiment of an enhanced operability system for a gas turbine engine.

FIG. 5 is a schematic view of enhanced operability system 10e, an alternative embodiment of enhanced operability systems 10d. Enhanced operability system 10e is generally similar to enhanced operability system 10d, except that chemical system 48 is a barbotage system that supplies H$_2$ to fuel channel 32 of injectors 16 via fuel barbotage line 56. Barbotage line 56 may, for example, supply H$_2$ to fuel line 19 upstream of injectors 16. In the embodiment of FIG. 5, heating element 36 may, for instance, be a heat exchanger heated by an exothermic reaction in mixer 54 between lithium borohydride from first chemical source 50 and water from second chemical source 52, as follows:

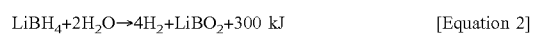

$$LiBH_4 + 2H_2O \rightarrow 4H_2 + LiBO_2 + 300 \text{ kJ} \quad \text{[Equation 2]}$$

Hydrogen produced in the reaction of Equation 2 is barbotaged into combustor 12 to increase combustion ignitability and efficiency. The reaction of Equation 2 thus both enhances the hydrogen content of fuel 18 entering fuel line 32 of injector, and heats fuel 18 in fuel tank 14 to reduce the temperature gap that must be bridged to ignite combustor 12. Oxygen-rich air from OEA line 28 may simultaneously be used to increase the oxygen content of air injected into combustor 12 along air channel(s) 34. In some embodiments, a first reaction as described in Equation 1 may produce water used in a second reaction as described in Equation 2, such that heating element 36 is heated both resistively using electricity from a DBFC as illustrated in FIG. 4, and via heat exchanger from an exothermic reaction to produce hydrogen for barbotage, as depicted in FIG. 5. Byproduct lithium metaborate may be stored for disposal, harmlessly dumped overboard, or injected into fuel channel 32 of injectors 16 for supplemental oxygenation.

Enhanced operability systems 10a, 10b, 10c, 10d, and 10e enhance startup and sustained operation of engine 11 by improving combustion ignitability and efficiency in combustor 12. These embodiments may be combined, as appropriate, to increase oxygen concentration in combustor air, increase hydrogen concentration in engine fuel, and raise fuel temperature.

The following are non-exclusive descriptions of possible embodiments of the present invention.

A fuel system for a gas turbine engine comprises: a fuel tank; an injector disposed to inject fuel from the fuel tank and air into a combustor of the gas turbine engine; an air separation module disposed to pump nitrogen-enriched air into the fuel tank for inerting, and oxygen-enriched air into the combustor via the injector for combustion.

The fuel system of the preceding paragraph can optionally include, additionally and/or alternatively, any one or more of the following features, configurations, and/or additional components:

wherein the gas turbine engine is an auxiliary power unit.

further comprising a heating element configured to preheat fuel from the fuel tank.

wherein the heating element is a resistive heater.

wherein the resistive heater is powered by a thermoelectric generator.

wherein the thermoelectric generator uses an aircraft cabin as a heat source, and a tail cone as a heat sink.

wherein the resistive heater is powered by a direct borohydride fuel cell.

wherein the direct borohydride fuel cell directly oxidizes and decomposes lithium borohydride and oxygen into lithium metaborate and water to power the resistive heater.

wherein the heating element is a heat exchanger.

wherein the heat exchanger heats the fuel via an exothermic reaction that produces gaseous hydrogen for barbotage.

wherein the exothermic reaction combines lithium borohydride with water to produce hydrogen and lithium metaborate.

A fuel system for a gas turbine engine, the fuel system comprising: a fuel tank; an injector disposed to inject fuel from the fuel tank into a combustor of the gas turbine engine; a barbotage system configured to feed hydrogen to the injector; and a heating element configured to pre-heat fuel from the fuel tank.

The fuel system of the preceding paragraph can optionally include, additionally and/or alternatively, any one or more of the following features, configurations, and/or additional components:

wherein the barbotage system comprises a first chemical source, a second chemical source, and a mixer disposed to mix the contents of the first chemical source with the contents of the second chemical source to produce gaseous hydrogen.

wherein the first chemical source is a reservoir containing lithium borohydride.

wherein the second chemical source provides water.

wherein the heating element is a heat exchanger.

wherein the heat exchanger heats the fuel via an exothermic reaction in the mixer between the contents of the first chemical source and the contents of the second chemical source.

wherein the barbotage system feeds hydrogen into the injector by means of a fuel line from the fuel tank to a fuel channel of the injector.

further comprising an air separation module disposed to feed nitrogen-enriched air into the fuel tank for inerting, and oxygen-rich air into the combustor via the injector for combustion.

wherein the barbotage system feeds oxygen-rich air into an air channel of the injector.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system for a gas turbine engine comprising:
an injector disposed to inject fuel and air into a combustor of the gas turbine engine;
an air separation module configured to deliver oxygen-enriched air into the combustor via the injector for combustion;
a thermoelectric generator having an aircraft cabin as a heat source, and a tail cone as a heat sink; and
a heating element comprising a resistive heater powered by the thermoelectric generator and configured to pre-heat the fuel.

2. The fuel system of claim 1, wherein the gas turbine engine is an auxiliary power unit.

3. The fuel system of claim 1, wherein the heating element is a circulative heating element configured to heat the fuel in a fuel tank.

4. The fuel system of claim 1, wherein the heating element is configured to heat fuel at a fuel inlet line to the injector.

5. The fuel system of claim 1, wherein the heating element is a heat exchanger.

* * * * *